United States Patent

[11] 3,628,828

| [72] | Inventors | Gerald A. Page;<br>James E. Page, both of Westhope, N. Dak. 58793 |
|---|---|---|
| [21] | Appl. No. | 37,101 |
| [22] | Filed | May 14, 1970 |
| [45] | Patented | Dec. 21, 1971 |

[54] VEHICLE BOX COVER
17 Claims, 10 Drawing Figs.

[52] U.S. Cl. .................................................. 296/137 B, 105/377
[51] Int. Cl. .................................................. B60j 7/10
[50] Field of Search .................................................. 296/100, 137 B; 49/203, 204, 250, 252; 220/29, 37, 38; 105/377

[56] References Cited
UNITED STATES PATENTS

| 1,803,424 | 5/1931 | Coseo | 105/377 |
| 3,169,492 | 2/1965 | Stiefel et al. | 105/377 |
| 1,344,322 | 6/1920 | Walker | 105/377 |
| 2,979,361 | 4/1961 | Eppinger et al. | 296/100 |
| 1,298,220 | 3/1919 | Jordan | 105/377 |

*Primary Examiner*—Benjamin Hersh
*Assistant Examiner*—Robert R. Song
*Attorney*—Merchant & Gould ABSTRACT: A pair of rigid cover sections cooperating to close the upwardly directed opening of a vehicle box in a first position and having a single elongated link pivotally attached between the box and each end of each section to limit the movement of the sections and rollers attached to an end section positioned adjacent and in parallel with the upper edge of each end of the box, said rollers being positioned to engage the cover sections for limiting and directing the movement thereof between the first position and a second position wherein the cover sections are positioned adjacent an in generally parallel with the outer surfaces of upstanding sidewalls of the box.

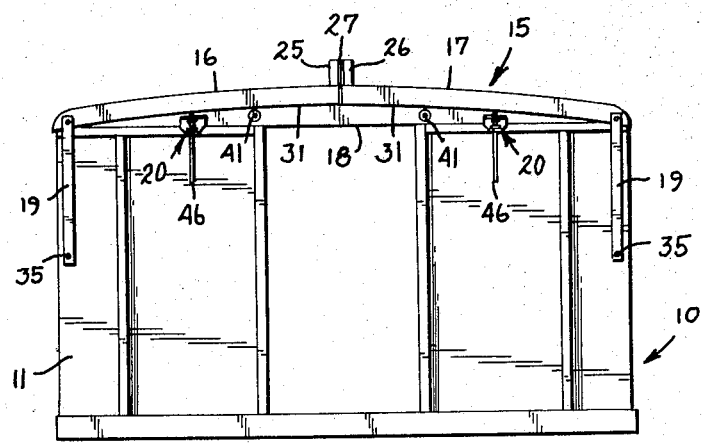
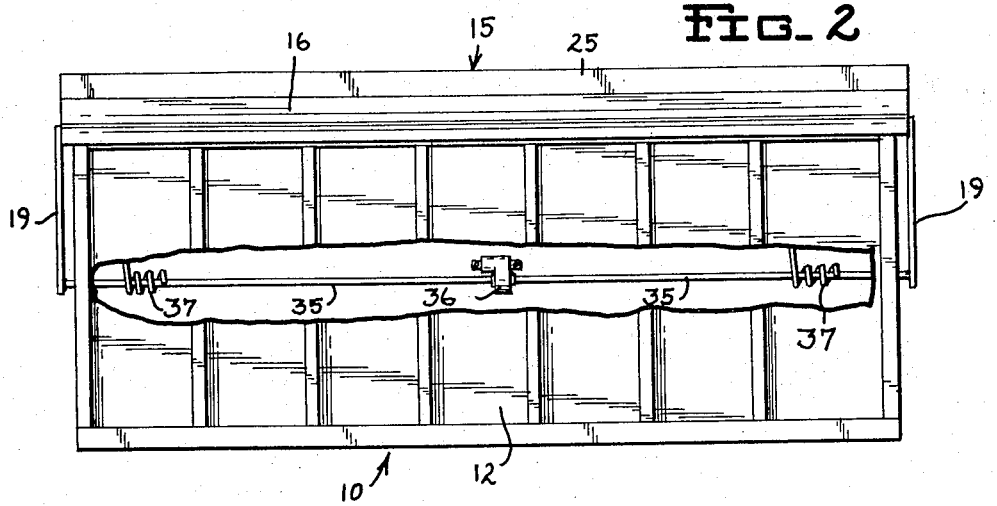
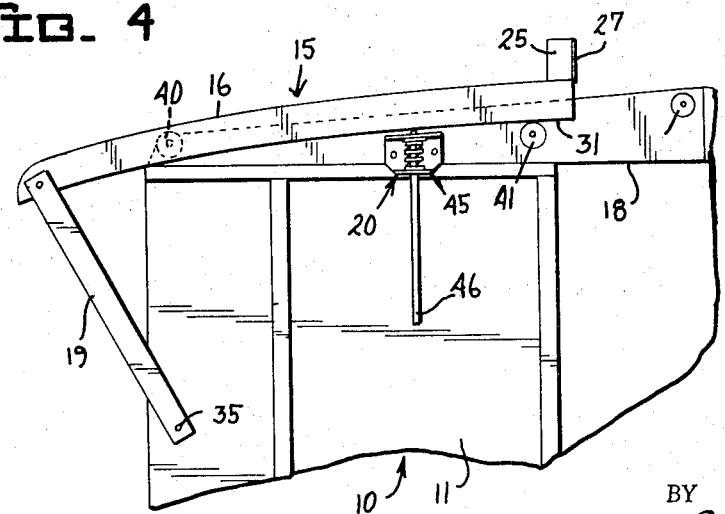
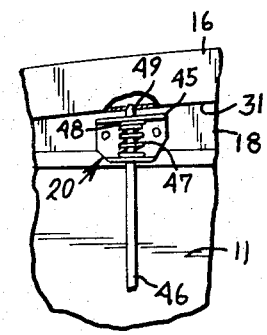

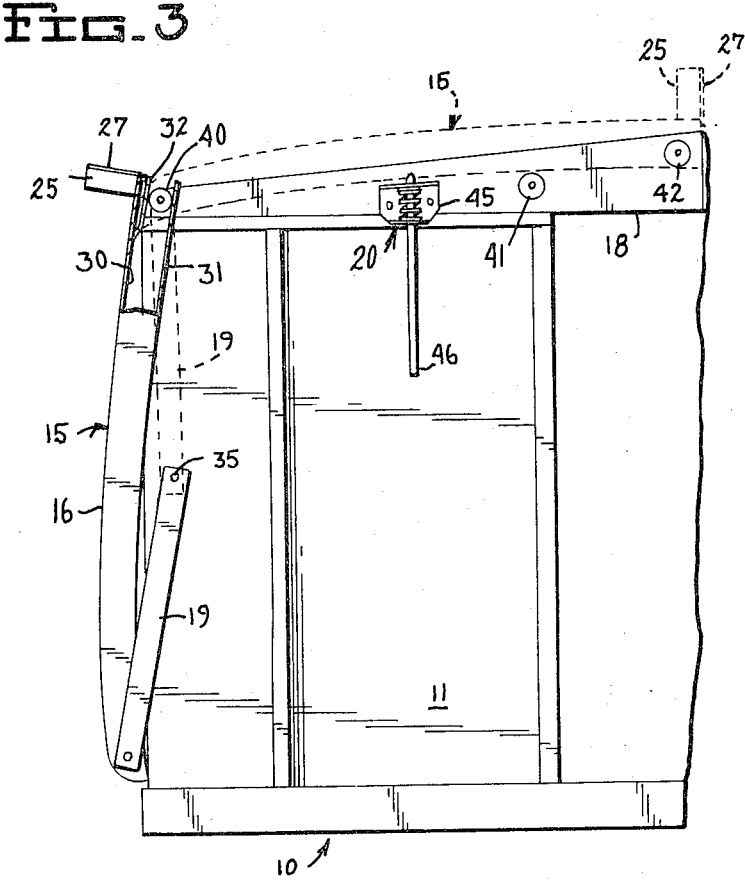
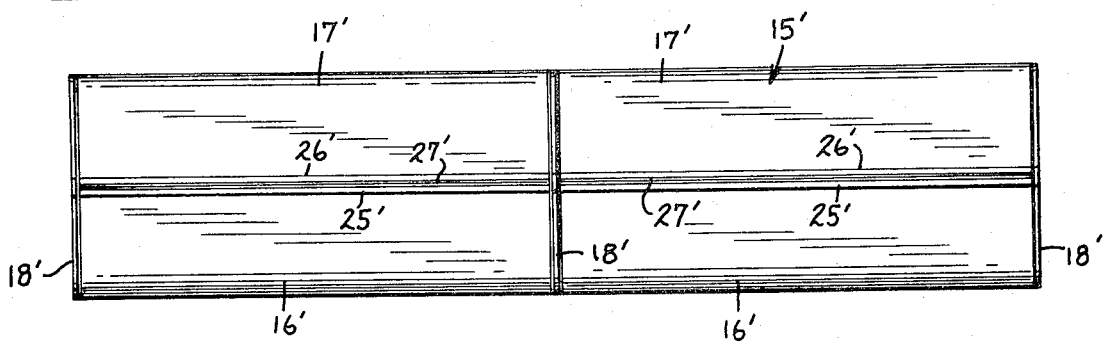

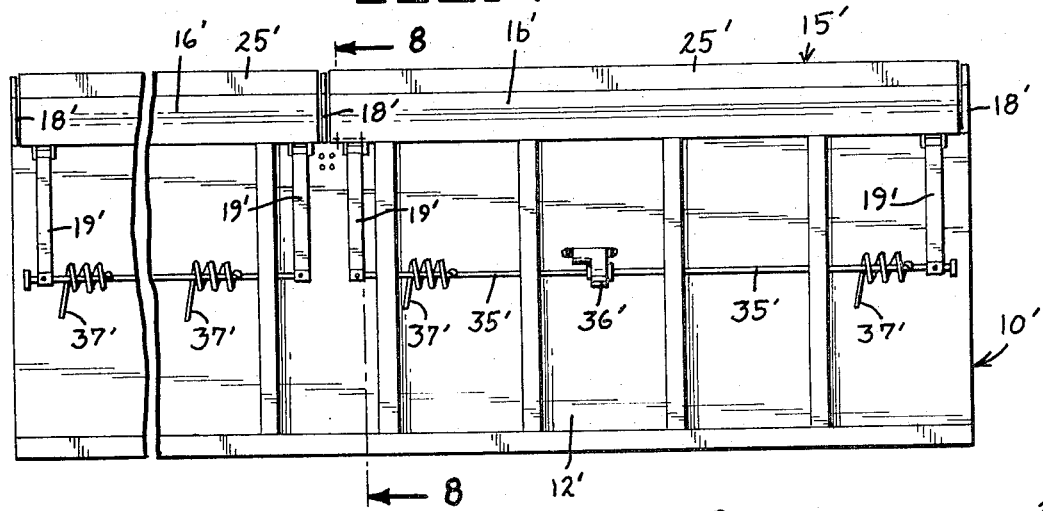
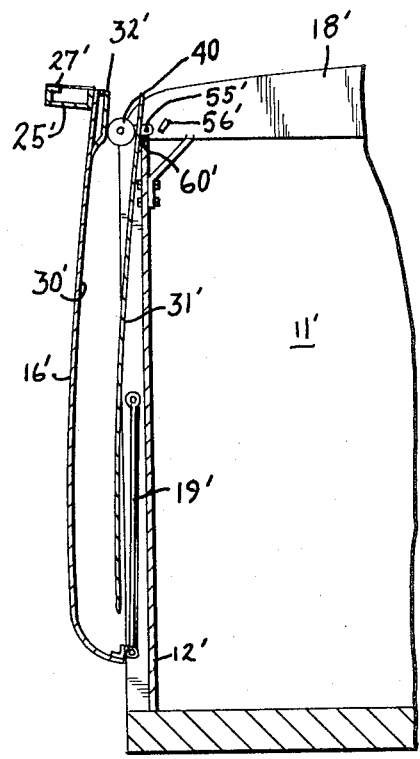
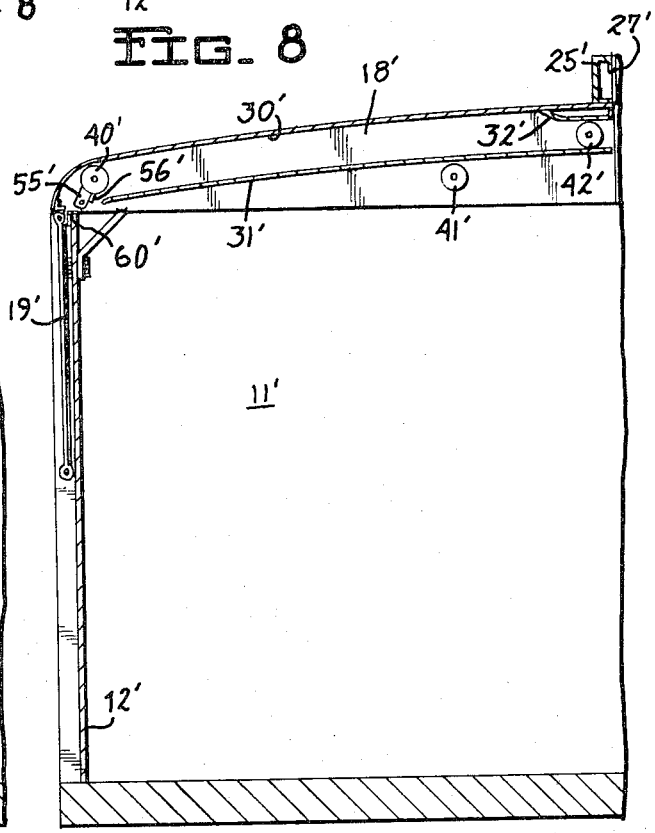
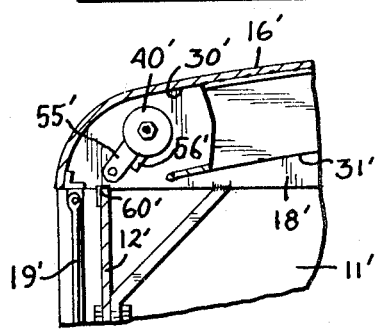

VEHICLE BOX COVER

BACKGROUND OF THE INVENTION

1. Field of the Invention

Many trucks, having boxes thereon with upwardly directed openings, are utilized for hauling loads which must be covered to be kept dry, clean, or for a variety of other reasons. In general, the cover must be removable from the box opening so that the truck can be readily loaded and unloaded. Further, because of regulations as to sizes of trucks (especially the width) the cover must be substantially the same width as the truck in the closed position.

2. Description of the Prior Art

In the prior art a great variety of flexible covers have been designed wherein the flexible cover can be rolled and unrolled over the truck box opening with relative ease (compared with manually covering a truck box opening with a tarpaulin). However, flexible coverings have a tendency to move violently (flap) during high-speed truck travel if the truck is not loaded sufficiently full so that the material engages the flexible cover to prevent the movement thereof.

Several types of rigid truck box covers have been devised, an example of which is illustrated in a U.S. Pat. entitled "Truck Box Covers," No. 2,979,361, issued to Eppinger et al. on Apr. 11, 1961. Eppinger et al. disclose two rigid halves of a truck box cover which are attached to the truck box by means of two links on each end of each half of the cover. The links are attached to the truck box by means of large plates which are bolted to the truck box. These large plates, which are relatively permanently affixed to the truck box, render the entire apparatus difficult to remove from the truck box. Further, because the plates must be attached to an end of the truck box, it is practically impossible to construct the apparatus of Eppinger et al. so that it will fit over large semitype trailers and the like. Because of the relatively great length of semitype trailers it is essential that covers therefor be braced at least once in the midportion thereof.

SUMMARY OF THE INVENTION

The present invention pertains to a vehicle box cover including at least one rigid cover section having an elongated link pivotally attached between each end thereof and the truck box and a plurality of bearing surfaces are affixed to end sections positioned adjacent the upper edges of the ends of the truck box so as to limit and direct the movements of the cover section between a first position overlying the opening of the truck box and a second position wherein the cover section is adjacent and generally parallel to an upstanding side of the box.

It is an object of the present invention to provide a new and improved truck box cover.

It is a further object of the present invention to provide covering apparatus for a vehicle box which is quickly and easily removable from the truck box.

It is a further object of the present invention to provide covering apparatus for a vehicle box which can be incorporated in covers for vehicle boxes of relatively great lengths, such as semitrailers, railroad cars, etc.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures:

FIG. 1 is a view in end elevation of a vehicle box having the present covering apparatus operatively mounted thereon;

FIG. 2 is a view in side elevation of the vehicle box and apparatus illustrated in FIG. 1, portions thereof broken away;

FIG. 3 is an enlarged fragmentary view of a portion of the box and apparatus as illustrated in FIG. 1, with the apparatus in an open position;

FIG. 4 is a view similar to FIG. 3 illustrating the apparatus in a different position;

FIG. 5 is an enlarged fragmentary view of a portion of the apparatus as seen in FIG. 1;

FIG. 6 is a view in top plan of another embodiment of the covering apparatus;

FIG. 7 is an enlarged view in side elevation of a different vehicle box and the embodiment of the apparatus illustrated in FIG. 6, portions thereof broken away;

FIG. 8 is an enlarged sectional view as seen from the line 8—8 in FIG. 7, portions thereof broken away;

FIG. 9 is a view similar to FIG. 8 with the covering apparatus in an open position;

FIG. 10 is an enlarged fragmentary view of a portion of the apparatus as seen in FIG. 8.

DESCRIPTION OF THE PREFERRED EMBODIMENT

Referring to FIGS. 1–4, the numeral 10 generally designates a vehicle box, such as a truck or the like, having an upwardly directed opening therein defined by a pair of parallel opposed end walls 11 joined by a pair of opposed sidewalls 12. Covering apparatus generally designated 15 is affixed to the vehicle box 10 so as to overlie the upwardly directed opening therein when the covering apparatus 15 is in a closed position. The covering apparatus 15 includes first and second cover sections 16 and 17, end sections 18 having a plurality of bearing surfaces thereon which will be described presently, a plurality of elongated links 19 and at least two locking devices 20.

Each of the cover sections 16 and 17 are constructed approximately similarly so that they cooperate to enclose the entire opening of the vehicle box 10. The cover sections 16 and 17 may be formed in substantially any manner desired to provide a rigid cover and in the present embodiment each section 16 and 17 includes a framework having a plurality of longitudinally spaced-apart ribs, a central beam assembly 25 and 26, respectively, part of which extends above the upper cover line and include a sealing material 27 on the adjacent surfaces thereof, and a skin formed of sheets of aluminum or the like. Each of the cover sections 16 and 17 are formed with a slight transversely oriented arc therein so that the center or junction is slightly higher than the outer edges in the closed position. At each end of each of the cover sections 16 and 17 upper and lower track means 30 and 31, respectively, are affixed beneath the skin so as to extend generally parallel therewith in the transverse direction. The upper and lower track means 30 and 31 are directed inwardly from the ends of the cover sections 16 and 17 and may be, for example, channel irons or the like affixed to the end edges of the cover sections 16 and 17 with the web portions thereof directed outwardly. A portion 32 is affixed to the upper track means 30 adjacent the inner end thereof to restrict the area between the upper and lower track means 30 and 31 adjacent the inner ends thereof.

In the present embodiment there are four elongated links 19, one positioned at each end of each of the cover sections 16 and 17. Each elongated link 19 is mounted with one end pivotally attached adjacent the outermost edge at the ends of the cover sections 16 and 17. The opposite ends of the elongated links 19 are pivotally affixed to the outer surface of the vehicle box 10 so that the elongated links 19 are generally vertically oriented with the cover sections 16 and 17 positioned in overlying relation to the vehicle box 10. In the present embodiment the lower ends of the elongated links 19 are affixed to shafts 35 which extend into the vehicle box 10 and the two pairs of shafts on each side of the vehicle box 10 are affixed to motors 36. The motors 36 are centrally mounted on each side of the vehicle box 10 and may be any convenient type of motor, such as electric, hydraulic, etc. Energization of the motors 36 causes rotation of the shafts 35 and consequent rotation of the elongated links 19 affixed to the outer ends thereof. A torsion spring 37 is affixed to each shaft 35 associated with each elongated link 19 so that the link 19 is biased in a direction to cause the cover sections 16 and 17 to move toward the box overlying position. It should be understood that the motors 36 and shafts 35 are illustrated as one embodiment for automatically moving the cover sections 16 and 17 between an overlying and an open position, and many other methods and apparatus might be utilized to perform this maneuver, such as handcranks, simply lifting the cover sections from the open position into the closed position, etc.

End sections 18 are positioned in parallel engagement with the upper edge of each of the ends walls 11. The end sections 18 may be constructed of any convenient material, such as steel or the like, and may be attached to the upper edge of the end walls 11 by any convenient means, such as bolts or the like. The upper surface or edge of each of the end sections 18 is angularly formed to generally conform with the cover sections 16 and 17. Each of the end sections 18 has two sets of rollers affixed to the outwardly directed surface thereof. Each set of rollers includes three rollers 40, 41 and 42. The roller 40 in each of the four sets is affixed adjacent the outermost corners of the end sections 18, generally in line with the upper end of the elongated link 19 (in that corner) and approximately midway between the upper and lower track means 30 and 31, with the associated cover section 16 or 17 in the overlying position. Thus, in the closed or overlying position the cover sections 16 and 17 are supported substantially by the elongated links 19 and do not rest on the outermost rollers 40. The rollers 42 are positioned on each side of the center of the end section 18 so as to be received between the upper and lower track means 30 and 31 with the cover sections 16 and 17 in the overlying or closed positions. The space between the upper and lower track means 30 and 31 is slightly larger than the diameter of the roller 42 so that the portion 32 (forming a portion of the upper track 30) is engaged by the roller 42 as the associated cover section 16 or 17 moves into the closed position. The rollers 41 of the various sets of rollers are spaced outwardly from the center of the end sections 18 on either side thereof and are positioned slightly below the lower track means 31 with the associated cover section 16 or 17 in the overlying or closed position.

In the operation of the covering apparatus 15, the cover sections 16 and 17 move between a first position wherein they overlie or cover the upwardly directed opening of the vehicle box 10 and a second position wherein they are adjacent and generally parallel the sidewalls 12 of the vehicle box 10. In the first or overlying position the cover sections 16 and 17 are supported by the rollers 42 and elongated links 19. As the cover sections 16 and 17 are moved outwardly the inner edge is disengaged from the rollers 42 and the lower track means 31 moves slightly downwardly into engagement with the rollers 41. Because of the orientation of the various components, the cover sections 16 and 17 move transversely outwardly along the top of the vehicle box 10 a short distance before beginning any noticeable or substantial pivotal movements. As the inner edges of the cover sections 16 and 17 approach the associated rollers 41 the elongated links 19 have pivoted outwardly to a position in which the roller 40 has engaged the upper track means 30. Further movement of the cover sections 16 and 17 causes the outer edges of the cover sections 16 and 17 and the ends of the elongated links 19 attached thereto to begin moving downwardly so that the lower track means 31 is disengaged from the roller 41 and the cover sections 16 and 17 begin to pivot about the roller 40. Eventually the cover sections 16 and 17 move into the second or open position wherein the weight is supported on the substantially vertically oriented elongated links 19 and the rollers 40, which are positioned adjacent the innermost edges of the associated cover sections 16 and 17, prevent outward rotation of the inner edges thereof. To move the cover sections 16 and 17 back into the first or overlying position the above-described procedure is simply reversed. While rollers 40, 41 and 42 are illustrated to enhance the movements of the cover sections 16 and 17, it should be understood that simple bearing surfaces, such as surfaces covered with material sold under the trademark "Teflon," would operate in place of the various rollers.

A locking device 20 is affixed to one of the end sections 18 on either side of the center thereof so as to engate each of the cover sections 16 and 17 in the first or overlying position. The locking device 20 includes a U-shaped bracket 45 affixed to the outer surface of the end section 18 by the bight thereof so that the generally parallel arms extend outwardly therefrom. A pair of axially aligned holes are formed in the arms of the U-shaped bracket 45 and an elongated rod 46 is engaged therethrough. A compression spring 47 is coaxially mounted over the rod 46 and positioned between the arms of the U-shaped bracket 45 so that the lower end thereof rests against the lower arm of the bracket 45. A shoulder 48, which may be a fixedly attached washer or the like, is provided on the rod 46 in spaced relation from the upper end thereof and normally sandwiched between the upper end of the spring 47 and the upper arm of the bracket 45. The shoulder 48 is positioned so that the upper end of the rod 46 extends beyond the bracket 45 and is normally engaged through an opening 49 in the associated cover section 16 or 17. The uppermost end of the rod 46 is tapered or rounded slightly so that it will easily engage the opening 49. The locking devices 20 are positioned so that the associated cover sections 16 and 17 move downwardly thereon to depress the rods 46, after which the associated cover sections 16 and 17 move transversely into the first or overlying position, at which time the rod 46 and opening 49 are aligned and the rod 46 automatically engages the opening 49 to maintain the cover sections 16 and 17 in the overlying position. To move the cover sections 16 and 17 into the open position the rods 46 are either depressed manually or some automatic means, such as an electrical solenoid, can be attached thereto for depressing the rods 46 when desired. Once the rod 46 is removed from engagement with the opening 49 the cover sections 16 and 17 are free to move into the second or open position. It should be understood that other locking devices will operate with the covering apparatus 15.

Referring to FIGS. 6–10, a second embodiment of the covering apparatus is illustrated, which embodiment is designed for use with long vehicles, such as semitruck trailers, railroad cars, etc. In this embodiment the structure is designed so that it does not overhang or overlie the ends of the vehicle box although any combination of the embodiment described with reference to FIGS. 1–5 and the embodiment to be described with reference to FIGS. 6–10 may be utilized if desired. In the embodiment illustrated in FIGS. 6–10 the numbers designating the various components have a prime added to indicate that it is a different embodiment and components the same as or similar to components in the previous embodiment are designated with the same number. Components that are the same as those in the previous embodiment will not be discussed in detail since the operation and construction thereof is similar.

In the embodiment illustrated in FIGS. 6–10, elongated links 19' are pivotally affixed to associated cover sections so they are substantially flat against and parallel with the sidewalls 12' of the vehicle box 10' in the first or overlying position and the second or open position. The outermost roller 40' is rotatably mounted at one end of an elongated member 55', the other end of which is pivotally attached to the outer end of the end section 18'. A stop member 56' limits the inward rotation of the roller 40' and member 55' to a position wherein the roller 40' is approximately midway between the upper track means 30' and lower track means 31' with the associated cover section in the first or closed position. The roller 40' and member 55' are further oriented so that the roller 40' extends a slight amount outwardly beyond the outer surface of the vehicle box 10' with the associated cover section in the second or open position (see FIG. 9).

In the operation of the second embodiment the associated cover section is supported by the link 19' and the innermost rollers 41', as in the previous embodiment. During opening movements of the covering apparatus 15' the associated cover section initially moves transversely outwardly and eventually engages the roller 41' and the roller 40'. During initial movements of the associated cover section the roller 40' is maintained in the inwardly pivoted position, because the member 55' is over center and resists pivotal movements thereof. As the associated cover section begins to pivot about the roller 40' the roller 40' also pivots into the position illustrated in FIG. 9. A fourth bearing surface 60' is provided in this embodiment at the upper outer edge of the sidewall 12' to provide for easy movements of the associated cover section in the event slight engagement of the associated cover section and the sidewall 12' occurs. When movement of the cover section is reversed the movements of the roller 40' and member 55' are reversed also. It can be seen that this particular embodiment of the covering apparatus does not overhang the end walls of the vehicle box so that the elongated link and a set of rollers can be mounted at a midsection of the vehicle box.

Thus, covering apparatus is disclosed wherein at least one cover section is affixed to a vehicle box for movements between a position overlying the upwardly directed opening therein and a position parallel with and adjacent a sidewall thereof. Because of the unique mounting apparatus for the cover section, the cover section is easily movable between the two positions manually or with some power apparatus, such as motors or the like. Also, the covering apparatus is quickly and easily installed or removed from the vehicle box by simply moving the cover sections to the open position and disconnecting the elongated links therefrom.

While we have shown and described specific embodiments of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What is claimed is:

1. Covering apparatus for an upwardly opening vehicle box comprising:
   a. two rigid cover sections adapted to cooperatively fit over and enclose the upwardly directed opening of a vehicle box, each of said sections having upper and lower track means affixed thereto adjacent each end thereof in generally transversely extending relationship;
   b. a plurality of elongated links, the outermost edge of each end of each of said cover sections having one of said links pivotally attached thereto adjacent one end and the other end of each of said links being pivotally attached to the vehicle box;
   c. two elongated end sections attachable to opposed ends of the vehicle box adjacent to and generally parallel with the upper edges thereof; and
   d. four first rollers, each of said first rollers being attached adjacent to a different end of said end sections and each of said first rollers being engaged between said upper and lower track means during movements of said cover sections between a first position overlying the upwardly directed opening and a second position wherein the cover section is adjacent and generally parallel to an upstanding side of the box.

2. Covering apparatus for an upwardly opening vehicle box as set forth in claim 1 having in addition, two bearing surfaces affixed to each of the end sections, adjacent the center thereof, in transversely spaced apart relationship and positioned to be received between the upper and lower track means of the cover sections in the first position.

3. Covering apparatus for an upwardly opening vehicle box, comprising:
   a. at least one rigid cover section adapted to fit over the upwardly directed opening of a vehicle box, said cover section including transversely extending upper and lower track means affixed thereto adjacent each end thereof;
   b. two elongated links each pivotally attached at one end to the vehicle box in longitudinally spaced relationship and pivotally attached at the other end to said cover section;
   c. a plurality of sets of bearing surfaces; and
   d. means mounting said sets of bearing surfaces on the vehicle box in longitudinally spaced relationship adjacent the upwardly directed opening of the box with the individual bearing surfaces of each of said sets spaced apart laterally for guiding and limiting movements of said cover section between a first position overlying the upwardly directed opening and a second position wherein the cover section is adjacent and generally parallel to an upstanding side of the box, at least one of said bearing surfaces being positioned between said upper and lower track means at each end of said cover section for guiding and limiting said movements of said cover section.

4. Covering apparatus for an upwardly opening vehicle box as set forth in claim 3 wherein the two elongated links are attached adjacent the outermost edge of the cover section and the vehicle box so as to be oriented approximately vertically when the cover section is in the first and the second positions.

5. Covering apparatus for an upwardly opening vehicle box as set forth in claim 3 wherein the mounting means includes end sections engageable to the upper edge of the ends of the vehicle box with at least one set of bearing surfaces operatively attached to each end section.

6. Covering apparatus for an upwardly opening vehicle box as set forth in claim 3 wherein the bearing surfaces are rollers.

7. Covering apparatus for an upwardly opening vehicle box as set forth in claim 6 wherein one roller in each set is mounted for movements between a position above the vehicle box and a position at one side of the vehicle box.

8. Covering apparatus for an upwardly opening vehicle box as set forth in claim 6 wherein at least one individual roller in each set of rollers is positioned to engage the lower track means and at least two individual rollers in each set of rollers is positioned to engage the upper track means.

9. Covering apparatus for an upwardly opening vehicle box as set forth in claim 1 having in addition spring means mounted to provide a bias on the elongated links in a direction to urge the cover section into the first position.

10. The apparatus of claim 3 wherein said bearing surfaces positioned between said track means are mounted adjacent an upper edge of said upstanding side of the box to hold an upper edge of said cover section adjacent the side of the box in said second position.

11. The apparatus of claim 10 wherein said bearing surfaces positioned between said track means are mounted for movements between a position above the box and a position at one side of the box.

12. Covering apparatus for an upwardly opening box, comprising:
   a. a rigid cover section, having inner and outer edges, adapted to fit over at least a portion of the upwardly directed opening of the box, said cover section including track means affixed to each end thereof;
   b. two elongated links each attached at one end to the box in longitudinally spaced relationship and pivotally attached at the other end adjacent said outer edge of said cover section for movements of said cover section between a first position overlying the upwardly directed opening and a second position wherein the cover section is adjacent and generally parallel to said upstanding side of the box;
   c. a pair of bearing surfaces; and
   d. means mounting said bearing surfaces adjacent the upper edge of said upstanding side of the box and above said track means, said bearing surfaces and track means cooperating to guide and limit said movements of said cover section.

12. Covering apparatus for an upwardly opening box as set forth in claim 12 including a second pair of bearing surfaces mounted on said box in longitudinally spaced relationship and in positions to engage upper surfaces of said track means adjacent the inner edge of said cover section with said cover section in said first position, to thereby prevent upward movement of said inner edge of the cover section.

14. Covering apparatus for an upwardly opening box as set forth in claim 13 including a third pair of bearing surfaces mounted on said box in longitudinally spaced relationship, between and laterally aligned with said first and second pairs, said third pair engaging lower surfaces of said track means to provide guidance and support for said cover section during at least a portion of the swinging movements thereof between said first and second positions.

15. Covering apparatus for an upwardly opening box as set forth in claim 14 wherein the bearing surfaces are rollers.

16. Covering apparatus for an upwardly opening box, comprising:
   a. a rigid cover;
   b. link means pivotally connecting said cover to said box for movement of said cover between a first position overlying the box and a second position adjacent an upstanding side of the box;
   c. bearing means mounted adjacent an upper edge of the upstanding side of the box; and
   d. said cover having transversely extending track means affixed thereto, said track means being positioned beneath said bearing means and having an upper surface thereof engaging said bearing means during at least a portion of said cover movements to guide and limit said movements.

17. The apparatus of claim 16 wherein said link means are pivotally connected to said cover adjacent an outermost edge thereof.

* * * * *